United States Patent [19]

Kouril et al.

[11] 4,112,366
[45] Sep. 5, 1978

[54] ELECTROMAGNETIC DISPLACEMENT SCANNER USING AN E-SHAPED CORE OBLIQUE TO THE SCAN DIRECTION

[75] Inventors: Oldrich Kouril; Jaroslav Knourek, both of Brno, Czechoslovakia

[73] Assignee: Vyzkumny a vyvojovy ustav Zavodu vseobecneho strojirenstvi, Brno, Czechoslovakia

[21] Appl. No.: 726,576

[22] Filed: Sep. 27, 1976

[30] Foreign Application Priority Data

Sep. 25, 1975 [CS] Czechoslovakia ................. 6470-75

[51] Int. Cl.² ........................................... G01R 33/12
[52] U.S. Cl. .................................. 324/208; 340/195;
310/168
[58] Field of Search .............. 324/34 R, 34 D, 34 PS, 324/34 GT, 173, 179, 174; 340/195, 196, 347 P; 33/125 C; 336/30; 318/658; 310/111, 168

[56] References Cited

U.S. PATENT DOCUMENTS

| | | | |
|---|---|---|---|
| 2,731,599 | 1/1956 | Groeper | 336/30 |
| 2,882,516 | 4/1959 | Neergaard | 340/195 |
| 2,941,170 | 6/1960 | McCoy | 324/34 PS |
| 3,010,063 | 11/1961 | Rhoades | 340/195 |
| 3,036,266 | 5/1962 | Hulls | 324/34 D |
| 3,649,450 | 3/1972 | Barton | 340/196 |

FOREIGN PATENT DOCUMENTS 954,893 4/1964 United Kingdom ................. 340/195

Primary Examiner—Robert J. Corcoran

[57] ABSTRACT

An improved electromagnetic scanner has a substantially E-shaped core having an outer surface that is positioned, at a predetermined air-gap spacing, from a regularly grooved ferromagnetic surface of a textile machine. A pair of coils extend around the crosspiece of the core between the outer arms of the core and the middle arm thereof, such coils being connected in series and connected to a bridge circuit to generate an electrical indication that varies at the rate of movement of the grooved ferromagnetic surface past the core in a direction crossing the grooves in the surface. The plane of said core is oblique to the grooves. A pair of abrasion-resistant, non-magnetic contact elements supported in the spaces between the arms of the core, projecting outwardly into the air gap, and are urged into contact with the moving ferromagnetic surface by a spring carried in a housing in which the core and coils are mounted.

5 Claims, 12 Drawing Figures

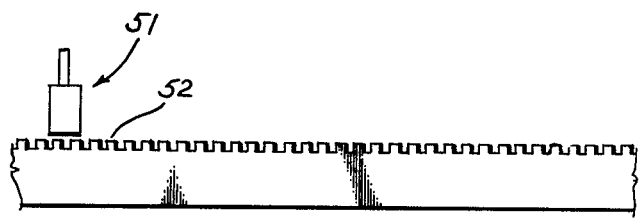
FIG.6
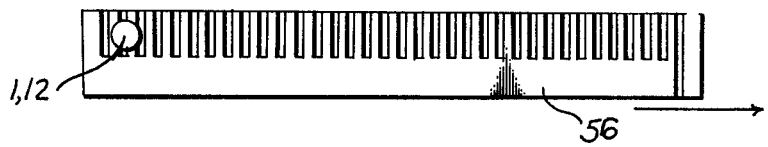
FIG.7
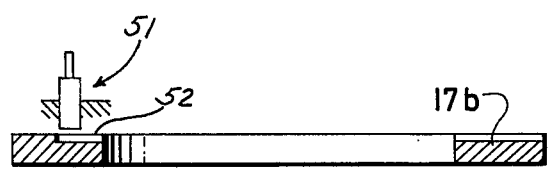
FIG.8
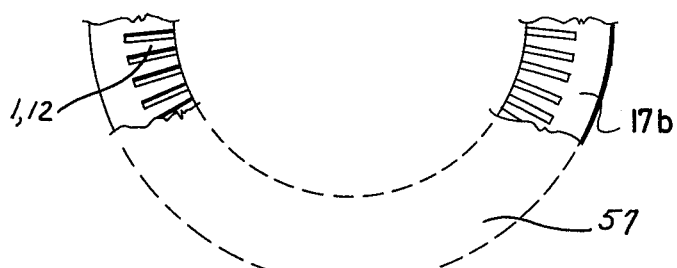
FIG.9
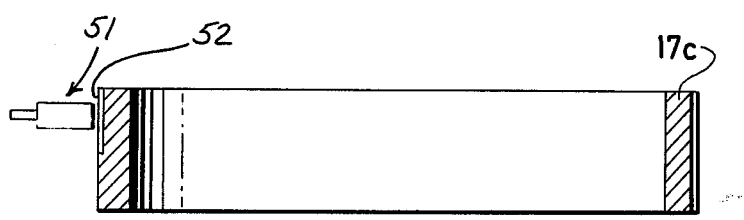
FIG.10
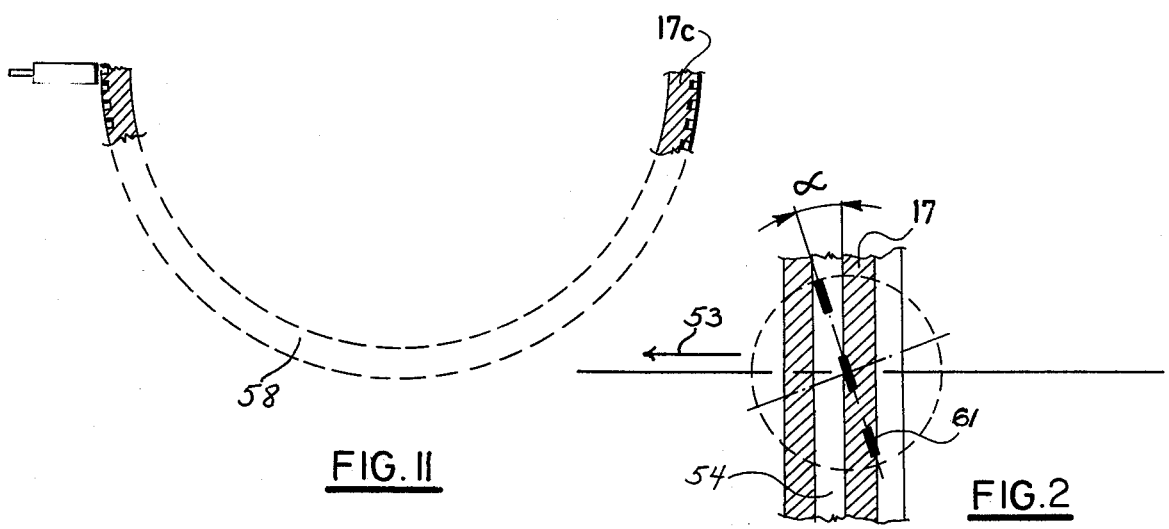
FIG.11
FIG.2

ELECTROMAGNETIC DISPLACEMENT SCANNER USING AN E-SHAPED CORE OBLIQUE TO THE SCAN DIRECTION

BACKGROUND OF THE INVENTION

The invention relates to electromagnetic scanners of the type positionable opposite a moving ferromagnetic surface of a textile machine, such scanner being adapted to generate, by induction, an electrical output signal which varies with the rate of movement of the regularly grooved portions of the surface past the scanner in a direction crossing the grooves.

In a known arrangement of this type, a first AC-excited coil supported in magnetic coupling relation to a core is adapted to sense the change in reluctance sensed by the core as the alternating teeth and grooves of the ferromagnetic surface move past the scanner. A second coil is also disposed in magnetic coupling relation to the first coil to generate a voltage proportional to the changes in magnetic excitation of the first coil, and the voltage generated by the second coil is processed in an electronic evaluation circuit, with the results of such evaluation being arranged to control the parameters of the textile machine associated with the moving ferromagnetic surface.

A disadvantage of such arrangement is the relatively low amplitude of induced voltage in the second coil, particularly in the case of a large number of closely spaced grooves on the ferromagnetic surface. In addition, the electronic evaluation circuits for processing the induced voltage have been complicated and expensive.

SUMMARY OF THE INVENTION

Such disadvantages are overcome in accordance with the invention with the provision of an improved electromagnetic scanner which responds to changes in magnetic reluctance in the manner described above. In an illustrative embodiment, the scanner includes a substantially flat, E-shaped magnetic core having a crosspiece and three spaced arms extending therefrom toward the ferromagnetic surface. Two of the arms terminate in aligned relation in a first surface which is separated from the moving ferromagnetic surface by a predetermined air gap, while the third arm is foreshortened and terminates inwardly of the first surface to locally increase the air gap.

A pair of coils are supported on the crosspiece of the core in magnetic coupled relation therewith within the respective core gaps between the outer arms and the central arm thereof. The so-supported coils are connected in series, and the outer terminals of the resulting series path are coupled across the outer terminals of a pair of resistances in an AC bridge circuit. The resultant electrical indication, taken off between the junctions of the series-connected coils and the series-connected resistors, exhibits a relatively large and sensitive rate of change in accordance with the passage of the successive alternating grooves of the ferromagnetic surface past the core in directions crossing the grooves.

Preferably, a pair of elongated contact elements, formed from sapphire or other non-abrasive, non-magnetic material, are supported in the gaps between the successive arms of the core and project outwardly from the first surface to contact the moving ferromagnetic surface. Such contact elements, which may be chamfered or tapered at their respective longitudinal ends to minimize wear, are normally urged against the moving ferromagnetic surface by a spring carried in an outer cylindrical housing in which the core is movably supported. For this purpose, the core may be secured in a slot cut into an end region of a second cylindrical housing within the first housing.

The foreshortening of one of the outer arms of the core as indicated above serves to increase the peak-to-peak amplitude of the electrical signal emerging from the bridge. Alternatively, the three arms of the core may all terminate in the same first surface.

BRIEF DESCRIPTION OF THE DRAWING

The invention is further set forth in the following detailed description taken in conjunction with the appended drawing, in which:

FIG. 2 is an end view of the scanner of FIG. 1 or FIG. 4, in which the plane of the core of the scanner is shown disposed oblique to the direction of movement of the ferromagnetic surface and to the grooves in the surface;

FIG. 6 is a sectional view of a translatable ferromagnetic bar bearing a grooved surface which is cooperable with the scanner of FIGS. 1-2 and 4;

FIG. 7 is a top view of the bar of FIG. 6;

FIG. 8 is a sectional view of a ferromagnetic disc having an alternating grooved structure cooperable with the scanner of FIGS. 1-2 and 4;

FIG. 9 is a top view of the disc of FIG. 8;

FIG. 10 is a sectional view of a ferromagnetic cylinder having an outer grooved peripheral surface cooperable with the scanner of FIGS. 1-2 and 4;

FIG. 11 is a top view of the cylinder of FIG. 10; and

DETAILED DESCRIPTION

Figure 1:
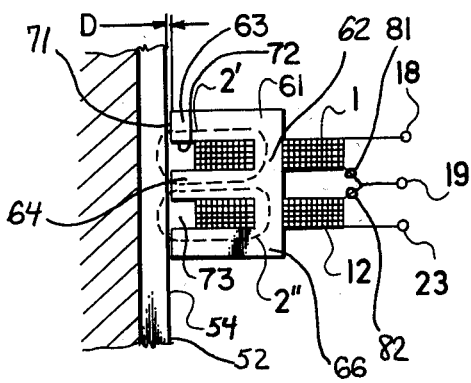
FIG. 1 is a front view of a first embodiment of electromagnetic scanner constructed in accordance with the invention, such scanner being shown in magnetic coupling relation to a grooved ferromagnetic surface relatively movable with respect to the scanner.

Referring now to the drawing, FIGS. 1 and 2 depict a first embodiment of an electromagnetic scanner 51, which may be positioned opposite a moving, grooved ferromagnetic surface 52 of a textile machine (not shown). Illustratively, the surface 52 may include a plurality of spaced teeth 17 which alternate, in a direction of advance of the surface 52 as indicated by an arrow 53, with a plurality of grooves 54. As shown in FIG. 2, the plane of the magnetic core 61 is positioned obliquely to the direction 53 of advance of the ferromagnetic circuit 52. The portion of the textile machine carrying the grooved surface 52 may be a translatory bar structure 56, as depicted in FIGS. 6 and 7; alternatively, the surface 52 may be defined on a circular disc 57 as indicated in FIGS. 8 and 9, or on the outer surface of a ferromagnetic cylinder 58, as depicted in FIGS. 10 and 11.

Referring again to FIGS. 1 and 2, the indicated embodiment of the scanner 51 includes a magnetic core 61, illustratively of E-shape, which may be formed from a stack of laminated sheets in a conventional manner, if desired. Preferably, the maximum thickness of the resulting core, which defines a pair of magnetic circuits 2′, 2″, corresponds to half the thickness of each groove 54 in the direction of movement of the surface 52.

The core 61 includes a cross piece 62, extending generally parallel to the surface 52, and three arms 63, 64 and 66 extending outwardly from the cross piece 62 and terminating in a first surface 71 nominally spaced by an air-gap distance D from the grooved surface 52. In the arrangement of FIG. 1, all three of the core arms terminate in aligned relation on the surface 71.

A transverse gap 72 is defined in the core between one of the outer arms 63 and the center arm 64, while a second gap 73 is formed between the other outer arm 66 and the central arm 64.

A pair of coils 1, 12 are respectively disposed around and coaxial with the cross piece 62 of the core 61. The coil 1, which is in magnetic coupling relation with the circuit 2′, is captured within the gap 72 of the core 61. The coil 12, which is magnetically coupled to the other circuit 2″, is captured within the gap 73. With such arrangement, terminals 18, 81 of the coil 1 will provide an electrical indication corresponding to changes in the reluctance of the circuit 2′ as the surface 52 moves past the scanner 51, while terminals 23, 82 of the coil 12 will provide an electrical indication of simultaneous changes of reluctance of the circuit 2″.

The terminals 81 and 82 of the coils 1 and 12 are connected to a common terminal 19, so that the coils are effectively connected in series.

Figure 3:
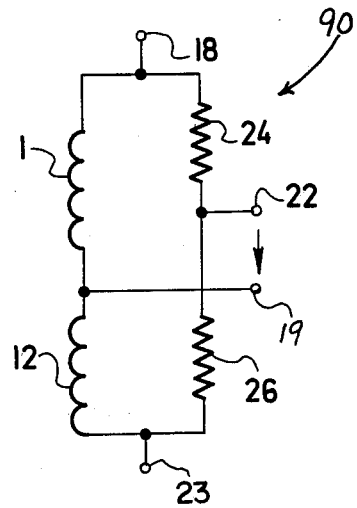
FIG. 3 is a schematic diagram of a bridge circuit into which the coils of the scanner of FIGS. 1-2 may be connected to derive an electrical output indication that varies at the rate of relative movement of the scanner and the ferromagnetic surface.

As shown best in FIG. 3, the series-connected coils 1 and 12 have their outer terminals 18, 23 connected into a bridge circuit 90 that includes a pair of serially connected resistors 24, 26. The terminals 18, 23 are connected across the outer terminals of the serially connected resistors, and such parallel connected outer terminals are suitably excited with an AC voltage. The output of the bridge, taken between the intermediate terminal 19 at the junction between the coils 1 and 12 and a junction 22 between the resistors 24 and 26, represents the output of the scanner 51 and exhibits a highly sensitive variation of voltage at the rate of movement of the ferromagnetic surface 52 past the scanner 51.

Figure 4:
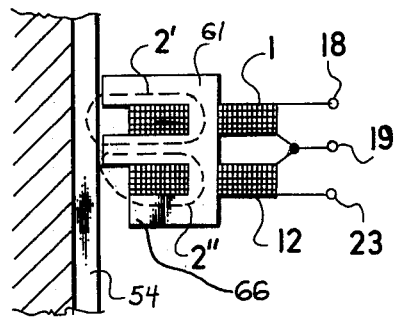
FIG. 4 is a front view, similar to FIG. 1, of a second embodiment of electromagnetic scanner constructed in accordance with the invention.

In order to increase the sensitivity of variation at the output of the bridge 90, the modification shown in FIG. 4 may be employed. In this case, the outer arm 66 of the magnetic core 61 is forshortened so that it terminates inwardly of the surface 71 forming the nominal air-gap D. Such expedient, which locally increases the air-gap opposite the arm 66, results in a much smaller rate of change of reluctance of the magnetic circuit 2″ relative to that of the circuit 2′.

FIGS. 6 and 7 illustrate the relationship of the scanner 51 with respect to the ferromagnetic region 52 defined on the translatory bar 56. In like manner, the positioning of the scanner 51 over a corresponding surface defined on a portion of an endregion of the ferromagnetic circular disc 57 is shown in FIGS. 8 and 9. And in FIG. 10, the relationship between the scanner 51 and the grooved surface 52 defined on the outer periphery of the cylinder 58 is shown.

Figure 5:
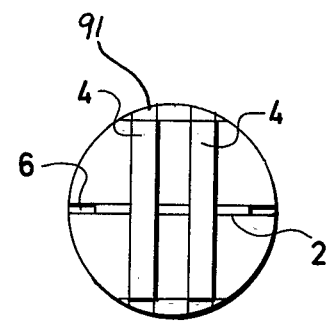
FIG. 5 is an end view of the housed electromagnetic scanner of FIG. 12.
Figure 12:
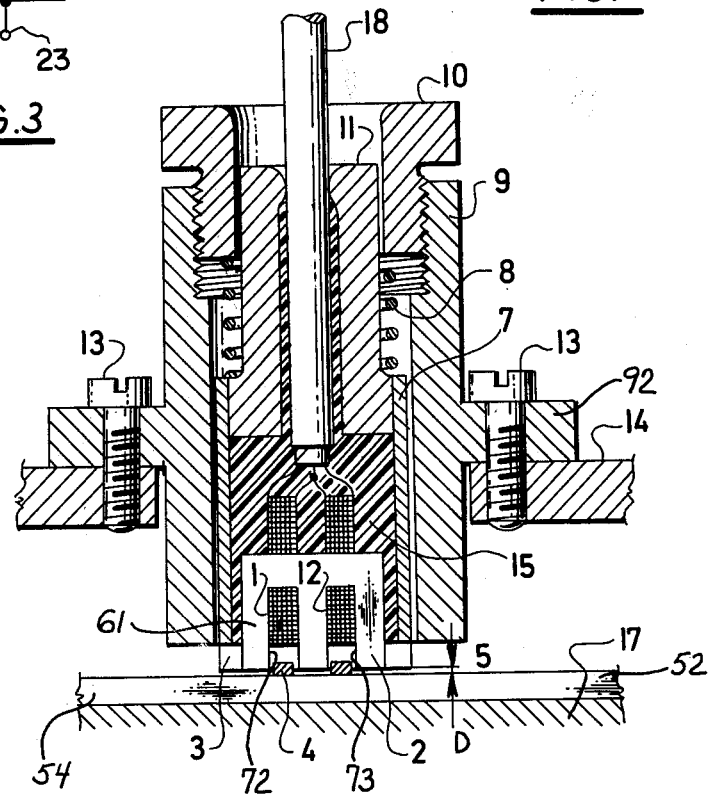
FIG. 12 is a longitudinal view, in section, of a completely housed scanner assembly of the type indicated in FIGS. 1-2, with the core of the scanner carrying a pair of sapphire contact members extending into the air gap between the core and the moving ferromagnetic surface.

A complete housed assembly of the scanner 51 of FIG. 1 is shown in FIGS. 12 and 5. An inner cylindrical housing 7 is provided at a lower end thereof with a longitudinal slot 6, which receives the flat magnetic core 61. The scanner 51 is embedded in an insulating material 15, such as epoxy resin, in the lower portion of the housing 7, with the outer surface 71 of the core 61 projecting from the lower end of the housing 7 as shown.

A pair of abrasion resistant, non-magnetic contact elements 4, illustratively of sapphire, are supported in the outer portions of the gaps 72, 73 of the magnetic core 61. The elements 4 extend outwardly, preferably for the distance of the air-gap D, from the outer surface 71 of the core 61. In addition, the elements 4 extend in a plane perpendicular to the plane of the core 61, and thereby contact a plurality of successive teeth 54 (FIG. 2) of the ferromagnetic surface 52. In order to prevent excessive wear on the longitudinal ends of the elements 4, such ends may be bevelled or tapered as at 91 (FIG. 5). An electrical cable 18, like the core 61 and coils 1 and 12, is embedded in the epoxy resin 15 within the housing 7, and contains therein electrical conductors extending from the terminals of the coils 1 and 12 in a conventional manner.

The housing 7 is supported for sliding movement within an outer housing 9, which is closed at its top end by means of an adjustment nut 10. The bottom of the nut 10 engages an upper surface of a compression spring 8, whose lower end bears on the top of the housing 7 to urge such housing, and thereby the contact elements 4, downwardly against the ferromagnetic surface 52.

The outer housing 9, in turn, may include a projecting intermediate portion 92 which bears against a support frame 14 associated with the textile machine. The projecting portion 92 is secured to the support member 14 via screws 13.

In the foregoing an illustrative arrangement of the invention has been described. Many variations and modifications will now occur to those skilled in the art. It is accordingly desired that the scope of the appended claims not be limited to the specific disclosure herein contained.

What is claimed is:

1. In an electromagnetic scanner positionable opposite a regularly grooved ferromagnetic surface relatively movable with respect to the scanner in a first predetermined direction at a first rate for generating, at the output of the scanner, an electrical indication variable at the first rate as the grooves move relatively to the scanner, said scanner comprising a substantially flat, E-shaped magnetic core having a crosspiece and three parallel arms disposed in space relation and extending outwardly from the crosspiece toward the grooved surface, at least two of the arms of the core terminating in aligned relation to define a first surface parallel to and spaced a predetermined distance from the grooved surface to establish an air gap therebetween, and first and second coils positioned in parallel relation around and coaxial with the crosspiece of the core between the respective outer arms of the core and the central arm thereof, the ferromagnetic surface exhibiting a series of teeth and grooves regularly spaced in alternating relation in the first direction, the plane of the core being oblique to the first direction and to said grooves, the maximum thickness of the core in the first direction being equal to half the width of the groove in the first direction.

2. A scanner as defined in claim 1, further comprising means for connecting the first and second coils in series, a bridge circuit having first and second resistance connected in series, means for connecting the outer terminals of the serially connected first and second coils in parallel with the respective outer terminals of the serially connected first and second resistances, and means for coupling an AC voltage across the parallel-connected outer terminals, the electrical indication at the output of the scanner appearing between the junction of the first and second coils and the junction of the first and second resistances, respectively.

3. A scanner as defined in claim 1, further comprising first and second abrasion-resistant, non-magnetic contact elements supported on the core in parallel spaced relation in the gaps between the respective outer arms and the central arm, respectively, of the core, the contact elements being aligned in a plane perpendicular to the plane of the core, the first and second contact elements having outer ends which project outwardly beyond the first surface of the core by the predetermined airgap distance, the outer ends of the first and second contact elements being bevelled.

4. A scanner as defined in claim 1, in which the outer surface of one of the outer arms of the core terminates inwardly of the first surface to locally increase the air gap.

5. A scanner as defined in claim 1, further comprising a first cylindrical housing having a slot at one end for receiving the core, a second cylindrical housing for slidably receiving the first housing, and means associated with the second housing for normally biasing the first housing in an outward direction.

* * * * *